(12) United States Patent
Dessevre et al.

(10) Patent No.: US 8,984,935 B2
(45) Date of Patent: Mar. 24, 2015

(54) TEST DEVICE FOR MEASURING LOADS SUPPORTED BY A TIRE

(75) Inventors: Dominique Dessevre, Clermont-Ferrand Cedex (FR); Pierre-Alain Begou, Clermont-Ferrand Cedex (FR); Mark Szente, Tura (HU); Jean-François Forissier, Clermont-Ferrand Cedex (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/819,801

(22) PCT Filed: Sep. 5, 2011

(86) PCT No.: PCT/EP2011/065335
§ 371 (c)(1),
(2), (4) Date: Apr. 9, 2013

(87) PCT Pub. No.: WO2012/032015
PCT Pub. Date: Mar. 15, 2012

(65) Prior Publication Data
US 2013/0213125 A1    Aug. 22, 2013

(30) Foreign Application Priority Data

Sep. 7, 2010    (FR) ...................................... 10 57079

(51) Int. Cl.
*G01M 17/02*    (2006.01)
*G01L 5/28*    (2006.01)

(52) U.S. Cl.
CPC ............ *G01M 17/02* (2013.01); *G01M 17/022* (2013.01)

USPC ................................................ 73/146; 73/721

(58) Field of Classification Search
USPC .................................................. 73/146–146.8
See application file for complete search history.

(56) References Cited

U.S. PATENT DOCUMENTS 3,483,744 A    12/1969    Goldberg
6,138,505 A *  10/2000    Miyazaki ........................ 73/146
(Continued)

FOREIGN PATENT DOCUMENTS

FR    2 866 114 A1    8/2005

OTHER PUBLICATIONS

International Search Report (PCT/ISA/210) issued on Oct. 7, 2011, by the European Patent Office as the International Searching Authority for International Application No. PCT/EP2011/065335.

(Continued)

*Primary Examiner* — Andre Allen
(74) *Attorney, Agent, or Firm* — Dickinson Wright PLLC

(57) ABSTRACT

A powered mobile test device for measuring loads supported by a running tire, said device being composed of a rigid frame carried by at least two carrying wheels to which a torque is applied, and having an axle which is fixed to the frame and which carries a test wheel for measuring the loads supported by said tire. The axle is connected to the frame by a loading actuator, a torque is applied to the test wheel, said torque applied to the test wheel is in the opposite direction to those applied to the carrying wheels, and a linkage system between the test wheel and the carrying wheels transmits at least some of the power developed by the braking torque applied to the test wheel or by the braking torques applied to the carrying wheels.

10 Claims, 2 Drawing Sheets

(56) References Cited

U.S. PATENT DOCUMENTS

Figure 1:
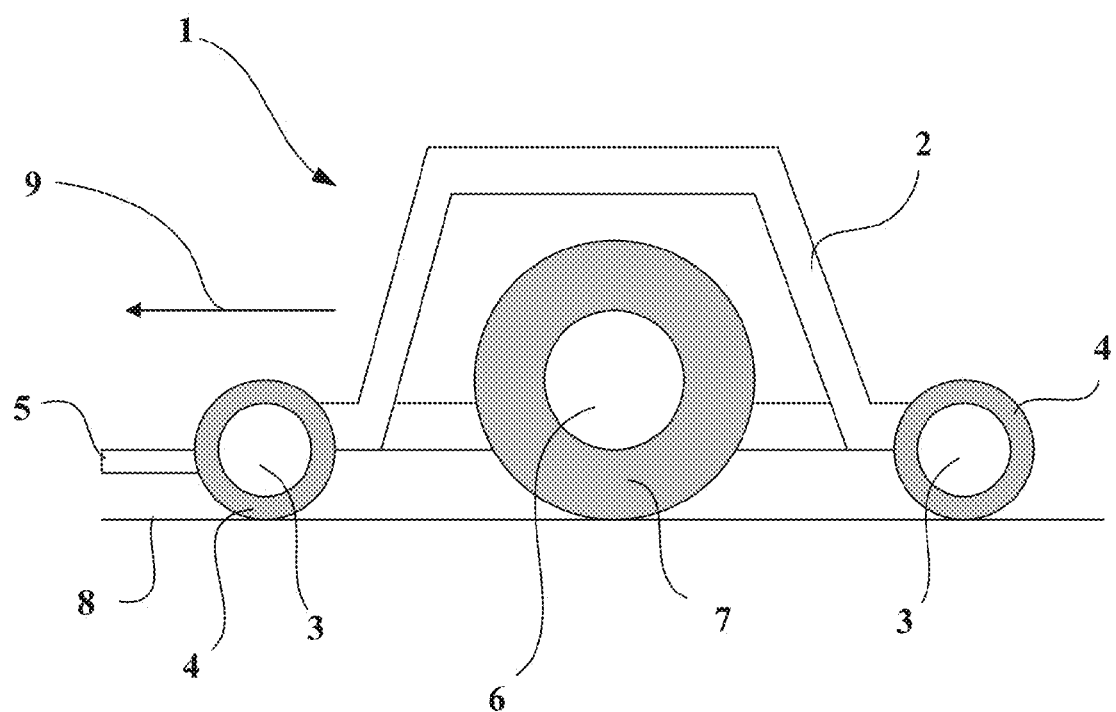

| | | | |
|---|---|---|---|
| 7,055,382 B2* | 6/2006 | Miyazaki | 73/146 |
| 2006/0075811 A1* | 4/2006 | Miyazaki | 73/146 |
| 2007/0073494 A1* | 3/2007 | Isono et al. | 702/41 |
| 2008/0236268 A1 | 10/2008 | McKeown et al. | |
| 2008/0282789 A1 | 11/2008 | Regis et al. | |
| 2012/0260726 A1* | 10/2012 | Cuttino | 73/146 |
| 2013/0068006 A1* | 3/2013 | Cuttino | 73/118.01 |

OTHER PUBLICATIONS

S. Hui et al., "Torque control strategy for a parallel hydraulic hybrid vehicle", Journal of Terramechanics, Dec. 1, 2009, pp. 259-265, vol. 46, No. 6.

S. Hui et al., "Research on the system configuration and energy control strategy for parallel hydraulic hybrid loader", Automation in Construction, Mar. 1, 2010, pp. 213-220, vol. 19, No. 2.

* cited by examiner

TEST DEVICE FOR MEASURING LOADS SUPPORTED BY A TIRE

The invention relates to a test device for measuring the loads supported by a tire running on soil.

Although it is not limited to these applications, the invention will be described more specifically with reference to tires fitted on agricultural vehicles of the tractor type running on soft or loose soils, and even more specifically with reference to tires fitted on the driving wheels of these vehicles.

The requirements for these vehicles are becoming increasingly severe, notably in terms of the compromise between the load carried and/or pulled and the damage to soils caused by the passage of the vehicle. This is because the desired rates of work and output are such that these vehicles must carry and/or pull increasingly heavy loads, while there is also a desire to cause less damage to soils in order to avoid damage to crops and limit the risks of erosion. In parallel with these conflicting requirements, there are more important requirements in terms of energy consumption which are present to an increasing extent in the world of agriculture. Running on soft soil, notably, leads to slippage of the tires on the soil, resulting in excessive consumption. Similarly, resistance to forward motion due to deformation of the tires and of the soil, because of the nature of the latter, also has a significant effect on the energy consumption of the vehicle.

These considerations regarding energy are equally applicable to running on hard ground such as tarmac, since the deformation of the tires is in itself enough to affect the energy consumption of the vehicle, with the increasing use of road travel over long distances at increasingly high speeds, approaching 50 km/hr or above.

Knowledge of the loads supported by a tire during the running of these vehicles, notably on soft soils, can make it possible to optimize the design of tires and, for example, to design them with allowance for the way in which they will be used.

The inventors have therefore set themselves the task of designing a test device for measuring the loads supported by a tire during the running of a vehicle to which the tire is fitted, where said vehicle runs on soft soil.

The inventors have also set themselves the task of providing a device of this type for making measurements on large tires which can carry loads of more than 8 tonnes. In fact, there are no means available at present which have sufficiently accurate measurement systems for reproducing the running conditions of these tires so as to enable the design of the tires to be optimized.

These objects are achieved according to the invention by a powered mobile test device for measuring the loads supported by a running tire, said device being composed of a rigid frame carried by at least two carrying wheels to which a torque is applied, and having an axle which is fixed to the frame and which carries a test wheel for measuring the loads supported by said tire, the axle being connected to the frame by a loading actuator, a torque being applied to the test wheel, said torque applied to the test wheel being in the opposite direction to those applied to the carrying wheels, with a linkage system between the test wheel and the carrying wheels transmitting at least some of the power developed by the braking torque applied to the test wheel or by the braking torques applied to the carrying wheels.

For the purposes of the invention, a torque is considered to be applied to a wheel if said torque originates from the direct action of a system fixed to the mobile test device.

Preferably, according to the invention, the torque applied to the test wheel is a driving torque, and the torque applied to the carrying wheels is a braking torque. According to the invention, the power developed by the braking torque applied to the carrying wheels is subsequently used in the form of driving torque applied to the test wheel via the linkage system, said power developed by the braking torque being recovered by the linkage system when the braking torque is applied to the carrying wheels.

However, the converse of this arrangement can also be provided by the device in order to meet specific test conditions, for example in the case of tests on wheels to be fitted to unpowered vehicles such as trailers. According to the invention, the power developed by the braking torque applied to the test wheel is subsequently used in the form of driving torque applied to the carrying wheels via the linkage system, said power developed by the braking torque being recovered by the linkage system when the braking torque is applied to the test wheel.

Advantageously, according to the invention, the mobile device has a weight of more than 12,000 kg.

A device of this type, designed according to the invention and constructed by any means known to those skilled in the art in order to maximize the rigidity of the rigid frame and obtain sufficient dimensions, can be used to analyze a tested tire having a diameter of more than 2 meters and/or a width of more than 0.9 meter, to which a vertical load of more than 80,000 N is applied.

In an advantageous embodiment of the invention, the mobile measurement device is associated with a powered vehicle.

In the case of a device having two carrying wheels, the powered vehicle is associated with the rigid frame to form a stable support for the test wheel.

In a preferred embodiment of the invention, the rigid frame is carried by four carrying wheels. In this embodiment, the powered vehicle is present solely for the purpose of supplying the power required to drive the mobile test device and for guiding it along the desired path. The accuracy of the measurements is improved by the greater stability of the mobile device, notably when running on uneven soils.

Additionally, in the same embodiment, the powered vehicle is advantageously positioned behind the mobile test device with respect to the direction of advance of the assembly, in order to make a further contribution to the improvement of the stability of the mobile test device and thus to the accuracy of measurement, notably when a large load is applied to the test wheel in the driving phase.

In another variant embodiment of the invention, the system supplying power to the motor for driving the mobile test device is located on the rigid frame, in which case said mobile test device is not associated with a powered vehicle.

The inventors have been able to show that the mobile test device designed in this way according to the invention allows tires to be made to run at constant speed while the test wheel is made to slip, thus making it possible to obtain measurements corresponding to known running conditions of the tested tire.

The inventors have been able to show that, in the case of a mobile test device which has four carrying wheels and is pulled or pushed by a powered vehicle, the device according to the invention can be driven at a specified constant speed, with the test tire slipping on the soil independently of the drive provided by the wheels of the powered vehicle, the latter being able to run without any gear engaged and therefore in freewheel mode. These measurement conditions enable even more accurate results to be obtained because of the increased stability. This is because the zero resultant of the loads, due to constant speed measurements, is obtained by adding together the loads which are essentially exerted at the level of the ground, and more precisely at the contact areas of the four tires of the carrying wheels and of the tested tire. This result is more accurate than when the wheels of the powered vehicle are driving or braking according to the desired conditions, because, in such a case, one of the loads from which a zero resultant of loads is obtained is no longer at the same level, but is located at the coupling bar or drawbar connecting the powered vehicle to the measurement device.

The linkage system between the test wheel and the carrying wheels transmitting at least some of the power developed by the braking torque also contributes to the accuracy of the measurement by limiting the size of the system supplying power to the motor which provides the motive power. Regardless of whether a powered vehicle or a system located on the mobile test device is used, it can be smaller and therefore create less interference with the measurements. This is because the weight can have a direct effect on the accuracy of measurement, since the wheels of the powered vehicle and/or the carrying wheels of the mobile device will compact the soil and thus modify the measurement environment. Furthermore, the costs associated with these powered vehicles or on-board systems are proportional to their size, or more precisely to the power that they deliver. Consequently the device designed in this way according to the invention enables the costs of the device to be limited.

Advantageously, according to the invention, the linkage system between the test wheel and the carrying wheels transmitting at least some of the power developed by the braking torque is of the hydraulic type. In other embodiments, the system may be a mechanical system or an electrical system.

An exemplary embodiment in the form of a mechanical system is based on a kinematic chain between the test wheel and the carrying wheels, such that the wheel required to act as the driving wheel rotates more rapidly, in terms of its peripheral speed, than the wheels required to act as braking wheels, again in terms of their peripheral speed. It is the peripheral speed that is considered here, rather than the rotation speed, because the diameters of the test wheel and the carrying wheels may differ significantly. Depending on the design or adjustment of the parameters of the kinematic chain, the gear reduction ratio between the peripheral speed of the test wheel and the peripheral speed of the carrying wheels can be adjusted according to the requirements of the test. In the exemplary mechanical embodiment, the kinematic chain can be formed by various well-known mechanical components such as a conventional mechanical gearbox allowing stepwise control of the gear reduction ratio between the test wheel and the carrying wheels. Another embodiment is based on the use of a speed controller to allow continuous control of the gear reduction ratio. A third possible embodiment of a mechanical kinematic chain uses an epicyclic gear train, in which the three shafts of the train, connected, respectively, to the two planet gears and to the internal satellite gear system of said train, are connected, outside the train, to the test wheel, to the system of carrying wheels, and to a gear reduction ratio control system.

For technical purposes, the kinematic chain of mechanical elements can be replaced by a hydraulic (or electrical) circuit comprising a hydraulic pump (or generator) connected to the carrying wheels and a hydraulic motor (or electric motor) connected to the test wheel, these two elements being connected through a hydraulic (or electrical) control unit which controls the torques and rotation speeds to provide the desired operation. By using motors and/or pumps (or motors and/or generators), adding a third controlled element, and so on, it is possible to achieve the improvements described above with reference to the mechanical version.

In a preferred embodiment of the invention, the test wheel is connected to the rigid frame by means of a hub support, the wheel being fixed to said hub, said hub support being connected to the rigid frame by a set of two arms, each of said arms being hinged about a transverse axis at one of its ends which is connected to the rigid frame and each of said arms being hinged about a transverse axis at its other end which is connected to the hub support.

In this embodiment of the invention, the presence of the two arms as described above contributes to the accuracy of the positioning of the test wheel and further improves the accuracy of the measurements. This is because the two arms improve the control of the various rotary movements of the hub support relative to the rigid frame. The two arms also hold the support accurately in the longitudinal and transverse directions with reference to the direction of advance of the mobile test device. The support is held in the vertical direction relative to the rigid frame by the loading actuator, which determines the load exerted on the test wheel.

The different directions are defined below with reference to a tire, and in the case of directions relative to the rigid frame it is the test tire that is referred to.

The circumferential direction of the tire, or longitudinal direction, is the direction corresponding to the periphery of the tire and defined by the direction of running of the tire.

The transverse or axial direction of the mobile device or of the tire is parallel to the axis of rotation of the tire.

The axis of rotation of the tire is the axis about which it revolves in normal use.

The rigidities of longitudinal and transverse translation relative to the rigid frame measured at the end of each of the two arms are greater than $2 \times 10^7$ N·m$^{-1}$, and even more preferably greater than $10^8$ N·m$^{-1}$.

The rigidity associated with the rotation of the hub support relative to the rigid frame along an axis coinciding with the longitudinal direction is greater than $1.6 \times 10^6$ N·m·rad$^{-1}$, and preferably greater than $6 \times 10^6$ N·m·rad$^{-1}$.

Preferably, according to the invention, the loading actuator is positioned in a substantially vertical direction and is fixed to the hub support at a transverse distance from the center of the test wheel which is less than 30 cm and even more preferably less than 15 cm for the largest loads applied.

For the purposes of the invention, the center of the wheel is, in the transverse direction, the middle of the rim on which the tested tire is placed.

In an advantageous embodiment of the invention, the mobile test device includes a soil preparation tool positioned in front of the test wheel according to the direction of advance of said mobile device during a test.

This tool can be used to modify the soil structure and adapt the measurement to chosen conditions. The tool is, for example, a wheel fitted with a tire which is made to compact the soil, as would be done by the front wheel of a tractor in advance of the wheel fitted on the rear driving axle. Alternatively it may be a coulter of the type fitted to a plough, or a series of teeth such as those fitted to a cultivator, thus making it possible to conduct tests corresponding to running on tilled or worked land.

Additionally, according to the invention, the fastening point of a tool of this type on the rigid frame can advantageously be adjusted in the transverse direction relative to the direction of advance, to provide different examples of effect on the appearance of the soil.

In a variant embodiment of the mobile test device according to the invention, the longitudinal direction of at least one carrying wheel forms an angle with the longitudinal direction of the test wheel. Preferably, the angles formed by the longitudinal directions of each of the carrying wheels with the longitudinal direction of the test wheel are identical.

In a variant embodiment of the invention of this type, measurements corresponding to running with lateral slip can be made.

In other variant embodiments of the invention, the directions of the axles of the carrying wheels form an angle with the transverse direction of the test wheel. This makes it possible to make measurements corresponding to the running of the test wheel with a camber angle.

The mobile test device according to the invention can be used, as described above, to obtain accurate measurements on the combination of a wheel fitted with a tire travelling on soil in known conditions. Advantageously, according to the invention, in the case of running on s soil, tests can be conducted on different soils with a given tire in order to identify more clearly the effect of a change in the soil and/or the effect of the tire.

Similarly, it is possible to conduct a plurality of tests on a single soil with different tires, in order to evaluate the effect of a change of tire and/or the effect of the soil.

Figure 2:
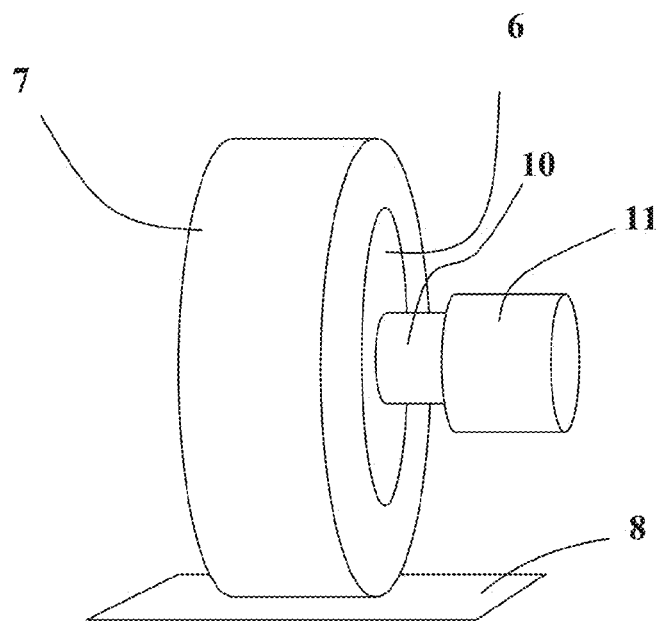
Figure 3:
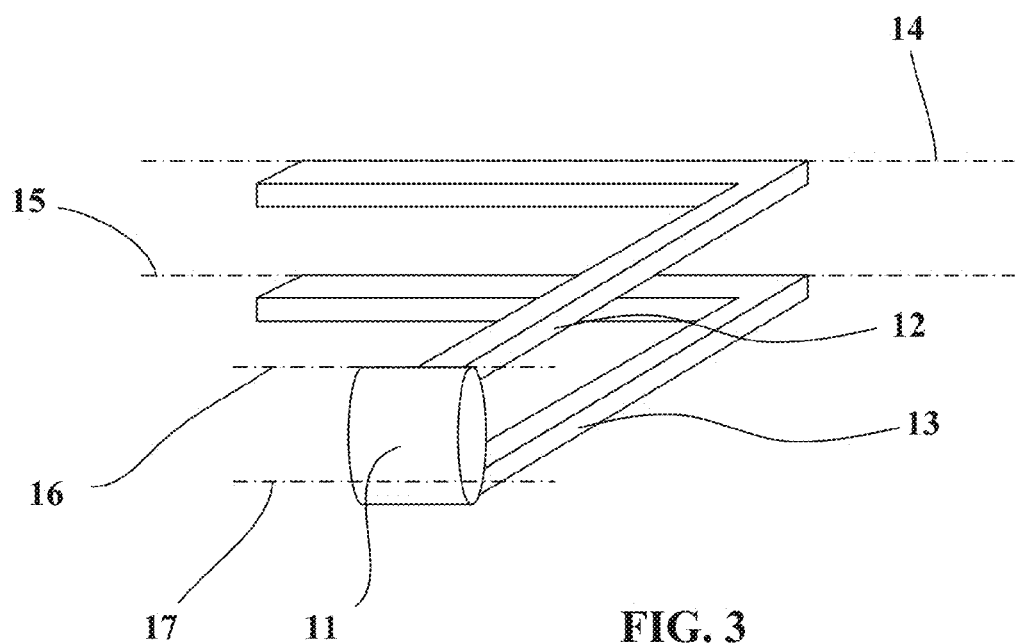

Other details and advantageous characteristics of the invention will be made clear by the following description of an exemplary embodiment of the invention, with reference to FIGS. 1 to 3, where:

FIG. 1 is a schematic representation of a mobile test device according to one embodiment of the invention, FIG. 2 is a partial schematic perspective representation of the test wheel associated with the hub carried by its support, and FIG. 3 is a partial schematic perspective representation of the arms carrying the hub support.

To make FIGS. 1 to 3 easier to understand, they are not drawn to scale.

FIG. 1 shows in a highly schematic manner a mobile test device 1. This device 1 is composed of a rigid frame 2 carried by four carrying wheels 3. Only two wheels 3 are shown in the diagram of FIG. 1, the other two being fixed to the other ends of the respective axles carrying the two illustrated wheels. The carrying wheels are fitted with tires 4. A drawbar 5 is provided to connect the device 1 to a powered vehicle (not shown in the drawing), and to transmit the necessary power from this vehicle towards the device 1.

FIG. 1 also shows the test wheel 6 carried by the rigid frame 2, this wheel being fitted with a tire 7.

The device 1 formed in this way is made to move on the soil 8 in the direction of the arrow 9.

As explained above and according to the invention, the test wheel 6 is driven by the power transmitted from the powered vehicle. The carrying wheels are either simultaneously driving wheels or simultaneously braking wheels, in order to provide running at constant speed with a test wheel slipping on the soil 8.

A system, which is advantageously hydraulic, connects the test wheel to the carrying wheels for the purpose of transmitting the power developed by the braking torque. This recovery of the braking power for supplying driving power makes it possible to limit the weight, size and cost of the motor of the powered vehicle.

FIG. 2 shows, again in a highly schematic manner but more precisely, the positioning of the test wheel fitted with the tire 7 on the hub 10 which causes it to rotate during the tests. This hub 10 is itself carried by the hub support 11 to which the loading actuator (not shown in the drawings) is fixed, said actuator being capable of exerting the load on the test wheel 6.

FIG. 3 is a schematic illustration of the two arms 12, 13, each of which is fixed at one end to the rigid frame 2 on the axes 14, 15 and is fixed at the other end to the hub support 11 on two axes 16, 17, rotary movements being provided about each of these axes.

The use of the two arms 12, 13 to hold the hub support 11 contributes to the accuracy of the positioning of the test wheel 6. On the one hand, the two arms improve the control of the various rotary movements of the hub support relative to the rigid frame, while on the other hand they hold it accurately in the longitudinal and transverse directions relative to the direction of advance 9 of the device 1.

The invention claimed is:

1. A powered mobile test device for measuring loads supported by a running tire, said device comprising:
   a rigid frame;
   at least two carrying wheels that carry the rigid frame and to which a torque is applied;
   an axle which is fixed to the rigid frame;
   a loading actuator that connects the axle to the rigid frame;
   a test wheel carried by the rigid frame for measuring the loads supported by said running tire;
   wherein a torque is applied to the test wheel, wherein said torque applied to the test wheel is in the opposite direction to torques applied to the carrying wheels; and
   a linkage system between the test wheel and the carrying wheels, wherein the linkage system transmits at least some of the power developed by a braking torque applied to the test wheel or by braking torques applied to the carrying wheels.

2. The powered mobile test device according to claim 1, wherein it is associated with a powered vehicle.

3. The powered mobile test device according to claim 1, wherein the rigid frame is carried by four carrying wheels.

4. The powered mobile test device according to claim 1, further comprising:
   a hub support that connects the test wheel to the rigid frame, wherein the wheel is fixed to said hub,
   a set of two arms connecting said hub support to the rigid frame, wherein each of said arms is hinged about a transverse axis at one of its ends which is connected to the rigid frame, and wherein each of said arms is hinged about a transverse axis at its other end which is connected to the hub support.

5. The powered mobile test device according to claim 1, wherein the loading actuator is positioned in a substantially vertical direction.

6. The powered mobile test device according to claim 1, wherein the loading actuator is fixed to the hub support at a transverse distance from the centre of the test wheel which is less than 30 cm.

7. The powered mobile test device according to claim 1, further comprising a soil preparation tool positioned in front of the test wheel according to the direction of advance of said mobile device during a test.

8. The powered mobile test device according to claim 1, wherein the longitudinal direction of at least one carrying wheel forms an angle with the longitudinal direction of the test wheel.

9. The powered mobile test device according to claim 8, wherein the angles formed by the longitudinal directions of each of the carrying wheels with the longitudinal direction of the test wheel are identical.

10. The powered mobile test device according to claim 1, wherein the directions of the axles of the carrying wheels form an angle with the transverse direction of the test wheel.

* * * * *